Figure 1:
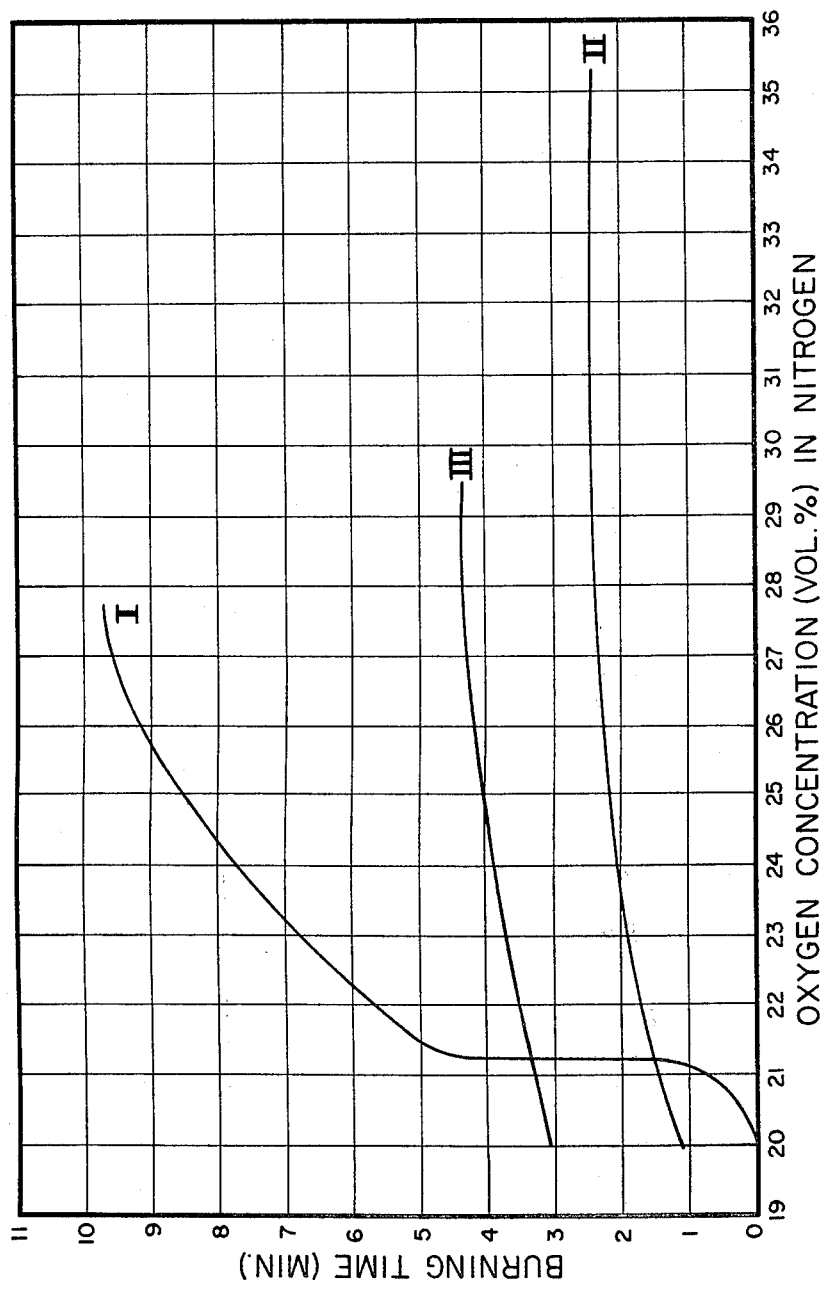

United States Patent [19]

Tomomatsu

[11] 4,002,689
[45] Jan. 11, 1977

[54] MODIFIED, FIRE RETARDANT POLYTETRAMETHYLENE ETHER GLYCOL

[75] Inventor: Hideo Tomomatsu, Crystal Lake, Ill.

[73] Assignee: The Quaker Oats Company, Chicago, Ill.

[22] Filed: Apr. 28, 1975

[21] Appl. No.: 572,071

Related U.S. Application Data

[62] Division of Ser. No. 505,535, Sept. 13, 1974, Pat. No. 3,936,425.

[52] U.S. Cl. .................. 260/615 R; 260/615 B
[51] Int. Cl.$^2$ .................................. C07C 43/17
[58] Field of Search ................ 260/615 R, 615 B

[56] References Cited

UNITED STATES PATENTS

| | | | |
|---|---|---|---|
| 2,481,278 | 9/1949 | Ballard et al. | 260/615 B |
| 2,492,955 | 1/1950 | Ballard et al. | 260/615 B |
| 2,555,270 | 5/1951 | Deebel | 260/615 R |
| 3,022,255 | 2/1962 | Morschel et al. | 260/615 B X |
| 3,358,042 | 12/1967 | Dunlop et al. | 260/615 B |
| 3,425,999 | 2/1969 | Axelrood et al. | 260/615 B X |
| 3,454,652 | 7/1969 | Dunlop et al. | 260/615 B |
| 3,764,546 | 10/1973 | Feltzin et al. | 260/633 |

FOREIGN PATENTS OR APPLICATIONS

| | | | |
|---|---|---|---|
| 2,327,116 | 12/1973 | Germany | 252/182 |
| 1,264,950 | 2/1972 | United Kingdom | 260/615 |

*Primary Examiner*—Howard T. Mars
*Attorney, Agent, or Firm*—Joseph P. O'Halloran

[57] ABSTRACT

Modified polytetramethylene ether glycol containing a 2,3-dibromo-2-butene segment is disclosed. This glycol maintains or improves properties of flexible polyurethanes and polyesters made therefrom and, in addition, improves the fire retardant properties of these resulting polymers. The chemically stable fire retardant diol provides a reactive flame retardant which is non-fugitive and non-migratory, and is neither extracted, nor volatilized from the elastomer into which it is incorporated.

2 Claims, 1 Drawing Figure

MODIFIED, FIRE RETARDANT POLYTETRAMETHYLENE ETHER GLYCOL

This is a division of application Ser. No. 505,535, filed Sept. 13, 1974, now U.S. Pat. No. 3,936,425.

BACKGROUND OF THE INVENTION

This invention provides a new fire retardant polytetramethylene ether glycol which is useful as a diol component in making fire retardant esters, and which is useful as a high molecular weight or macro diol ingredient, for example, in preparation of isocyanate prepolymers for polyurethane elastomers, and in the preparation of polyurethane elastomers by the so called one-shot methods in which a high molecular weight diol, a low molecular weight diol, e.g., 1,4-butane diol, and polyisocyanate are reacted directly. The resulting polymers are low temperature-flexible, fire-retardant elastomers having excellent, and in some instances improved properties such as, for example, tear strength and low temperature flexibility as compared to polymers prepared by an otherwise identical procedure and process but made from unmodified polytetramethylene ether glycol.

2,3-dibromo-2-butene-1,4-diol has been used as low molecular weight glycol chain extender in place of all or part of a 1,4-butane diol ingredient in polyurethane art for reaction with isocyanate glycol prepolymers. The resulting polyurethane product was generally crystalline, and had low resiliency. Even though the use of 2,3-dibromo-2-butene-1,4diol as the low molecular weight glycol chain extender has been known for three or four years, the undesirable hard, crystalline physical characteristics of the resulting elastomer has resulted, to the best of our present understanding, in very slow, if any, commercial adoption of this avenue towards providing improved fire retardant elastomers.

The use of polytetramethylene ether glycol, also known as poly(tetramethylene glycol) in the patent art, is widely known and well established as a high molecular weight diol in the manufacture of polyurethane and polyester elastomers.

It is an object of the present invention to provide a novel, modified polytetramethylene ether glycol which has improved fire resistance, which has physical and chemical properties substantially identical to those of the commercially established polytetramethylene ether glycols and which is useful as a reactive fire retardant in the manufacture of polyester and polyurethane compositions. Generally speaking, so called reactive flame retardants are preferred, in many respects, to the so called non-reactive flame retardants which are merely incorporated into elastomers mechanically or physically, and which are not chemically integrated in the elastomer molecule. The modified polytetramethylene ether glycol, in accordance with the present invention, provides a non-fugitive fire retardant component which will not migrate, be lost by solvent extraction, nor be volatilized, thus providing an extremely high level of permanence with respect to the fire retardant characteristics. In addition, in accordance with the present invention, the fire retardant component or ingredient provides a process convenience inasmuch as the use of polytetramethylene ether glycol is now well established with respect to polyester and polyurethane art, and inasmuch as the fire retardant modified polytetramethylene ether glycol in accordance with the present invention is incorporated into the elastomers and other polymers using known, established procedures. Additionally the bother associated with an additional ingredient is obviated as well as the problem of obtaining uniform distribution of an "inert" additive in the polymer matrix.

It is becoming increasingly more widely appreciated that fire retardant characteristics are provided by incorporating halogen-containing components into elastomers and other polymers. However, the halogenation of polytetramethylene ether glycol polymers by direct halogenation results primarily in alpha-halo ethers, and the chemical instability of alpha-halo ethers is well known. Chemically unstable halogen-containing polytetramethylene ether glycols would be regarded as unsuitable for use in the manufacture of polyurethanes, because the hydro-halic acid evolved would cause what would be regarded as intolerable levels and variation in the acid number. The compounds in accordance with the present invention are surprisingly stable with respect to chemical and physical properties.

In its broadest aspects, the present invention provides novel modified polytetramethylene ether glycols of the following formula:

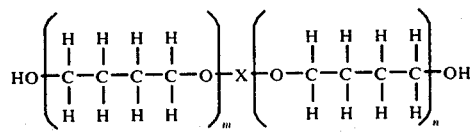

wherein $m$ and $n$ is an integer, can include zero, and wherein both $m$ and $n$ cannot be zero at the same time, and wherein X is:

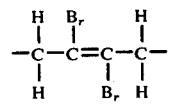

and wherein $m$ and $n$ are integers such that the number average molecular weight of the composition is in the range 400–5000 molecular weight inclusive.

The presently contemplated best mode for producing the modified polytetramethylene ether glycol in accordance with the present invention comprises reacting 2,3-dibromo-2-butene-1,4-diol with the catalytically active tetrahydrofuran-catalyst-polymer mixture which is formed as a result of the reaction of tetrahydrofuran and a tetrahydrofuran polymerization catalyst. The unsaturated monomeric bromo diol is added to the catalytically active mixture, and is permitted to react with the catalytically active tetrahydrofuran polymer prior to the termination of the remaining catalytic activity of the mixture by reaction with excess of water. The polymerization of tetrahydrofuran is discussed at great length in U.S. Pat. No. 3,454,652 to Andrew P. Dunlop and Edward Sherman for "Process for Producing Tetrahydrofuran Polymers". In that patent, the patentees describe in considerable detail the polymerization of tetrahydrofuran(THF), and, in addition, disclose a list of catalysts for polymerization of tetrahydrofuran, as well as a number of catalytic activity terminating agents. Catalytically active THF-catalyst-polymer mixture for use in accordance with the present invention can be made using any of the procedures set forth in that patent. Also, in accordance with the present invention, any of the catalytic activity termination agents set forth in that patent can be used, although the use of water or 1,4-butane diol is preferred.

It is not necessary that the temperature of the reaction mixtures be lowered prior to termination of catalytic activity. As set forth in the following discussion, it is preferred to permit the 2,3-dibromo-2-butene-1,4-diol to react at slightly elevated temperatures e.g. at 60° C. and above, prior to the catalytic activity termination.

The invention is further illustrated with the aid of the attached drawing and the following discussion and illustrative examples. FIG. 1 sets forth plots of actual test data of Example 8, herein, in which the burning times of the referred-to polyurethane elastomers are plotted against oxygen concentration (Vol. %) using the test equipment and conditions in accordance with ASTM designation D-2863 "Flammability of Plastics Using The Oxygen Index Method" as modified by Nelson and Webb.

In the discussion herein, and in the illustrative examples all temperatures are expressed in degrees centigrade and all parts are expressed in parts by weight unless otherwise indicated. In the following discussion and examples the preparation of compounds in accordance with the present invention is initially illustrated, and the use and incorporation of compounds in accordance with the present invention in the fabrication of polyurethanes and polyesters is then discussed, and the improved fire retardant characteristic is thereafter illustrated.

Examples 1–5 are summarized in Table 1, and Example 7 is summarized in Table 2. The fire retardancies of elastomers described in Examples 6 and 7 are illustrated in Example 8, and in FIG. 1. In the Tables, THF refers to tetrahydrofuran, FSA refers to fluosulfonic acid, and 2,3-DB refers to 2,3-dibromo-2-butene-1,4-diol. In Table 1, % Conversion refers to the weight of the reaction product (after unreacted monomers are stripped therefrom) divided by the total weight of the THF and 2,3-dibromo-2-butene-1,4-diol ingredients, multiplied by 100. Substantially quantitative yields, based on conversion, were achieved in each instance.

As used herein, $\overline{M}n$ refers to number average molecular weight. The number average weights obtained from calculations based on hydroxyl content as determined by acetylation is referred to as $\overline{M}n$ (OH). The number average molecular weight obtained from calculations based on vapor phase osmometer is referred to as $\overline{M}n$ (VPO). The number average molecular weight calculated from hydroxyl content based on reaction with phenyl isocyanate is referred to as $\overline{M}n$ (NCO).

EXAMPLE 1

453 grams (6.30 mol.) of tetrahydrofuran (THF) was placed in a three-neck flask equipped with a thermometer, a mechanical stirrer, and a dropping funnel connected to a drying tube. To this was slowly added at 25° C., 45 grams (0.45 mol.) of fluosulfonic acid. The mixture was reacted first at 35° C. for one hour and then at 25° C. for three hours to provide a catalytically active THF-catalyst-polymer mixture ("living polymer"). 110.6 Grams (0.45 mol.) of 2,3-dibromo-2-butene-1,4-diol was added to the mixture at 25° C., and the resulting mixture was heated and permitted to react at 60°–65° C. for three hours. The reaction mixture was then cooled to about 40° C. and quenched by addition of an excess of water namely about 500 grams. This amount of water added here is far more than enough to react stoichiometrically on a mole per mole basis with the fluosulfonic acid catalyst. The resulting mixture is subjected to steam distillation in which unreacted THF is removed, and an organic layer and an aqueous layer is formed. These layers were separated while hot. The steam distillation was repeated until the gel permeation chromatogram of the organic layer verified the absence of monomeric 2,3-dibromo-2-butene-1,4-diol in the organic layer. The organic layer was then diluted with an equal volume of toluene and neutralized with an excess of calcium hydroxide. The calcium hydroxide-containing organic layer was filtered, and the solvent was removed. The viscous liquid so obtained was subjected to a high vacuum stripping at 0.005 mm Hg/95° C. for several hours, and filtered through a celite bed to give 197.0 grams of clear viscous product. The IR and NMR spectra of this product agreed with the structure of formula 1 in which $n =$ zero, and the gas phase chromotograph study proved the absence of 2,3-dibromo-2-butene 1,4-diol. The other analytical data were as follows: Hydroxyl number: 74.30, Acid number: 0.048, $\overline{M}n(OH)$(by acetyl method): 1510, $\overline{M}n(NCO)$(by phenyl isocyanate): 1696, $\overline{M}n(VPO)$(vapour phase osmometer): 1358, and $B_r$ content by elemental analysis: 9.11%.

EXAMPLE 2

The procedure of Example 1 was repeated except that 878.4 grams (12.15 mol.) of THF was polymerized by 135 grams (1.35 mol.) of fluosulfonic acid, and the living polymer so form was reacted with 331.8 grams (1.35 mol.) of 2,3-dibromo-2-butene-1,4-diol prior to addition of the catalyst activity terminating agent, namely, water. After it was worked up as described in Example 1, it gave 324.6 grams of clear viscous product. Besides the agreements of the IR and NMR spectra with the proposed structure, it gave the following analytical results: Hydroxyl number: 130.100 mgKOH/g, Acid number: 0.062, $\overline{M}n(OH)$: 859, $\overline{M}n(NCO)$: 951, $\overline{M}n(VPO)$: 845, and $B_r$ content by elemental analysis: 19.17%.

EXAMPLE 3 AND 4

The procedure of Examples 1 and 2 is repeated in Tests 3 and 4 except that different ratios of reactants are utilized, as set forth in Table I. The results of Examples 3 and 4 are also summarized in Table I.

The analysis and characteristics of the compounds produced in accordance with Examples 3 and 4, which compounds are in accordance with the present invention, are also set forth in tabular form in Table I.

TABLE I

| Ex. No. | Mole Ratio | | | Reaction Condn. | Analysis | | | | | $B_r$ Content (%) | Conversion (%) |
| | FSA | THF | 2,3-DB | | OH No. MgKOH/g | H + No. MgKOH/g | Mn(OH) | Mn(VPO) | Mn(NCO) | | |
|---|---|---|---|---|---|---|---|---|---|---|---|
| 1 | 1 | 14 | 1 | 60° C/4 hr. | 74.293 | 0.048 | 1510 | 1358 | 1696 | 9.11 | 34.8 |
| 2 | 1 | 9 | 1 | " | 130.078 | 0.062 | 859 | 845 | 951 | 19.17 | 27.0 |
| 3 | 1 | 12 | 1 | " | 82.591 | 0.024 | 1355 | 1340 | 1316 | 12.48 | 32.2 |
| 4 | 1 | 10 | 1 | " | 105.298 | 0.000 | 1055 | 990 | 938 | 20.99 | 32.4 |

TABLE I-continued

| Ex. No. | Mole Ratio | | | Reaction Condn. | Analysis | | | | | B_r Content (%) | Conversion (%) |
|---|---|---|---|---|---|---|---|---|---|---|---|
| | FSA | THF | 2,3-DB | | OH No. MgKOH/g | H + No. MgKOH/g | Mn(OH) | Mn(VPO) | Mn(NCO) | | |
| 5 | 2 | 14 | 1 | " | 121.077 | 0.025 | 920 | 747 | 836 | 21.30 | 38.8 |

It is noted that the IR and NMR spectra of the product produced in accordance with the procedure of Examples 1–4 confirmed the structure set forth in formula 1 above in which $n$ is zero. That is, the products produced in accordance with Examples 1–4, inclusive, provide compounds in accordance with the present invention in which the 2,3-dibromo-2-butene segment is terminal with respect to the polytetramethylene ether glycol, that is, $n$ is zero.

Also in accordance with the present invention, the 2,3-dibromo-2-butene segment can be located internally with respect to the polytetramethylene ether glycol chain in which case $m$ and $n$ are both positive integers, not zero. An illustrative procedure for forming the compounds in accordance with the present invention in which the 2,3-dibromo-2-butene segment is internal is provided in Example 5 below.

EXAMPLE 5

The procedure of Example 1 is repeated except that the ratios of the reactants are changed.

The ratios of the reactants, and the analysis and other characteristics of the resulting product are set forth in Table 1 under Example 5.

It is noted that in Example 5 the molar ratio of fluosulfonic acid catalyst to 2,3-dibromo-2-butene-1,4-diol was 2:1. Generally speaking, the use of approximately ½ mole of 2,3-dibromo-2-butene-1,4-diol is preferred for the production of the improved modified polytetramethylene ether glycol in accordance with the present invention in which the 2,3-dibromo-2-butene segment is internally located.

Alternatively, generally speaking, the internal positioning of the 2,3-dibromo-2-butene segment can be achieved by adding the 2,3-dibromo-2-butene- 1,4-diol to the "living polymer" slowly at elevated temperatures e.g. 60°–65° C., regardless of the mole ratio of the reactants. However, the rate of the incorporation reaction of the 2,3-dibromo-2-butene-1,4-diol is surprisingly slow, and it is preferred to provide, as ingredients, the reactants in the desired ratios, adding the bromodiol ingredient at a relatively low temperature e.g. 25° C., and thereafter to raise the temperature to a temperature at which the subsequent reaction will take place at a reasonably fast rate e.g. 60° C. The NMR spectra of the product of Example 5 confirms the internally positioning of the 2,3-dibromo-2-butene segment in which $m$ and $n$ are both positive integers, not zero.

EXAMPLE 6

One mole of the bromine-containing modified glycol prepared in Example 2 was transformed into a polyurethane elastomer by reacting it with 2.78 mol. of diphenylmethane-4,4'-diisocyanate to form a "prepolymer", followed by chain extension of the prepolymer by 1.69 mol. of 1,4-butane diol. The prepolymer was prepared by melting the isocyanate starting material at 50° C., and charging it into the glycol at such a rate as to not exceed 70° C., and finally maintaining the resulting material at between 70°–80° C. for an hour, and then degassing at 5 mm. Hg at 75° C. The isocyanate member is then determined. Thereafter the 1,4-butane diol is added at 70° C., with slow stirring to avoid bubble formation and the hot mix is passed into a 110° C. mold and cured at 110° C. overnight. The elastomer so obtained was a non-tacky material.

Other physical characteristics of this elastomer were as follows: Hardness (Shore D): 55, Tensile strength (ASTM D-412 Instron): 5165 psi, Elongation (ASTM D-412 Instron): 303%, 100% Modulus (ASTM D-412 Instron): 2193 psi, 300% Modulus (ASTM D-412 Instron): 4710 psi, Split tear (Instron): 212 pli, Compression set (ASTM D-475 Constant Deflection) (B): 45%, and Rebound (Resilience Bashore): 33%. Thus, the elastomer prepared from the modified glycol of the present invention as illustrated in Example 9, proved to have a good fire resistant character.

The product produced in accordance with Example 6 was cast as an elastomer. To further illustrate the incorporation of the polytetramethylene ether glycol in accordance with the present invention in a thermoplastic cast elastomer the procedure of Example 7 is provided.

EXAMPLE 7

One mole of the bromine-containing diol prepared in Example 3 was transformed into a polyurethane elastomer by first forming a prepolymer by reacting the one mole of the fire retardant polytetramethylene ether glycol with 2.5 moles of diphenylmethane-4,4'-diisocyanate. This reaction is carried out in accordance with conditions which are well known in the thermoplastic polyurethane art as set forth in Example 6. The resulting prepolymer is then admixed with 1,4-butane diol at the ratio of 6.7 parts by weight of 1,4-butane diol per 100 parts of said prepolymer as in Example 6. These reaction conditions correspond to an isocyanate number of 1.005 per hydroxyl number. The resulting admixture constitutes a viscous liquid which was poured into a flat mold, covered and cured overnight at 110° C.

For the purpose of comparing the use of the modified polyether glycol in accordance with the present invention with conventional polytetramethylene ether glycol, a control test was run using a commercially available polytetramethylene ether glycol identified as Polymeg 1000 (T. M. The Quaker Oats Company). The comparison of the data of Example 7, including the comparison of the molecular weight, reactant ratios, and physical properties of the resulting cast elastomers is set forth in Table II.

TABLE II

| CAST ELASTOMER PROPERTIES | | |
|---|---|---|
| | (Polymeg 1000) Control | Modified Glycol |
| Glycol Analysis | | |
| OH No. | 113.6 | 82.59 |
| Mn (OH) | 988 | 1355 |
| Mn (VPO) | — | 1340 |
| Mn (NCO) | — | 1316 |
| Acid No. | .016 | .024 |
| Wt. % Bromine | — | 12.48 |
| Prepolymer Analysis | | |

TABLE II-continued

CAST ELASTOMER PROPERTIES

|  | (Polymeg 1000) Control | Modified Glycol |
|---|---|---|
| NCO/OH | 2 | 2.5 |
| % FNCO, Theory | 5.65 | 6.35 |
| Found | 5.41 | 6.34 |
| Reaction Time at 80° C. | 2 | 6 |
| Cast Thermoplastic Elastomers* |  |  |
| Ingredients |  |  |
| Prepolymer (parts by weight) | 100 | 100 |
| 1,4-BDO (parts by weight) | 5.8 | 6.7 |
| NCO/OH | 1.005 | 1.005 |
| Wt. % Bromine | — | 8 |
| Hardness Shore A | 83 | 85 |
| Shore D | 34 | 38 |
| Tensile Psi | 4790 | 3070 |
| Elongation % | 510 | 700 |
| 100% Modulus Psi | 650 | 730 |
| 300% Modulus Psi | 1280 | 1270 |
| Split Tear, Pli | 60 | 195 |
| Die "C" Tear, Pli | 370 | 430 |
| Bashore Rebound, % | 48 | 47 |
| Abr.Res. GMS-Loss | .031 | .18 |
| Compression Set (B) % | 46 | 57.5 |
| $T_f$ | −48.5 | −54.5 |

*Samples of each were dried 2 hours at 100° C. under house vacuum for Brabender stability tests. Brabender stability tests at 150° C. for 1 hour showed no difference between the two thermoplastic cast elastomers.

EXAMPLE 8

The fire resistant characteristics of the bromine-containing polyurethane elastomers were studied and FIG. 1 herein provides a comparison of the burning time at different oxygen concentration in nitrogen flow. In FIG. 1 three data plots are set forth and identified as Plot I, II, and III, respectively to depict the data obtained using polymers I, II, and III respectively. Polymer I is a control thermoplastic polyurethane elastomer prepared from polytetramethylene ether glycol MW10000 (Polymeg 1000 T. M. The Quaker Oats Company). See Example 7 and Table II for the elastomer preparation and the elastomer characteristics. Polymer II is a thermoplastic polyurethane polymer prepared from the bromine-containing diol described in Example 3. See Example 7 and Table II for the elastomer preparation and the elastomer characteristics. Polymer III is a polyurethane elastomer prepared from the bromine-containing diol described in Example 2. See Example 6 for the elastomer preparation and the elastomer characteristics. In the procedure of this example, the respective sample elastomers were cut into particles of 2–3 mm diameter, and 1.5 grams of the respective samples were used for each of the burning tests. The General Electric Oxygen Index Flammability Gauge, Model CR280FM11B was used with a small ceramic dish provided by the General Electric Fluid Flammability Test Kit Model CR280KF11A. Propane was used as the flame source and the ignitions were carried out for 20 seconds. It is noted that some unburned material remains at the end of the individual burning tests.

The method used in this test is similar to ASTM D-2863; however, it was found necessary to modify the ASTM test in accordance with the procedure of G. L. Nelson and J. L. Webb, "Oxygen Index of Liquids and Applications", J. Fire and Flammability, Vol. 4 pages 210–226. It is noted that the ASTM test referred to above strictly construed is the so-called "candle" test in which the sample to be burned is placed vertically and ignited at the top. Thermoplastic elastomers do not lend themselves to such procedure because of the fact that the vertical orientation is not maintained in the zone immediately adjacent the ignited portion of the sample, and inasmuch as the molten flaming material tends to flow downwardly over the rest of the sample thus rendering the test results non-comparable to rigid plastics, for example. Also, when strictly construed, the ASTM D-2863 method calls for observing the oxygen concentration required to provide three minutes of burning time. In the procedure of this example, burning times were determined at various oxygen concentrations, and the results were provided as a plot of burning time vs. oxygen concentration as shown in FIG. 1 herein, over a wide range of oxygen concentrations, and burning times. Generally speaking, it was found that the length of burning time changed with the concentration of oxygen in the nitrogen stream.

By this modified procedure the fire resistant characteristics and the burning patterns of the compounds are much more precisely observed than the method in which a specific burning time is specified e.g. three minutes. For example, it can be seen in Curve I in FIG. 1, which represents the burning pattern of the control elastomer referred to in paragraph 7, that the elastomer would burn at any length of time between 1.25 minutes and 4.5 minutes at its own limiting oxygen index number, 21.25. On the other hand, it is also apparent from curve II in the same figure, which represents the fire resistant elastomer prepared in Example 7 herein, that the burning time of this highly fire resistant elastomer does not reach three minutes. Carbonization is believed to be one of the important factors in the performance in this case, but it is not our intention to be bound by any theories in this respect.

The polyurethane polymer used in Test III differs from the polyurethane polymer of Test II in that the bromine content of the polymer III was approximately 8.6 percent, whereas the bromine content of polymer II was approximately 6 percent. It is apparent from a consideration of FIG. 1, that the burning characteristics of polymer III (see TEsts II and III) are vastly superior to those of polymer I, even though polymer III is not as good. It is preferred, in accordance with the present invention, that polyurethane elastomers made with the improved bromine-containing polytetramethylene ether glycol in accordance with the present invention utilize sufficient modified polytetramethylene ether glycol to provide more than 9.0 percent bromine in the resulting polyurethane elastomer.

EXAMPLE 9

1.1 mole of the modified polytetramethylene ether diol produced in accordance with Example 2 was heated to 80° C. with stirring while nitrogen was bubbled there through in a slow stream. Then 1.0 mole of maleic anhydride was added. The temperature was raised to 150° C. over 1 hour, ten to 190° C. over 4 hours. An exothermal reaction occured, and the heat was removed until the exotherm subsided. The temperature was maintained at 190° C. for 1 hour, and a vacuum of 100–200 mm. was applied. The temperature was lowered to, and maintained at 170° C. for 1 hour. The vacuum was removed, the reaction product permitted to cool to 100° C. under nitrogen. At 100° C. the liquid was poured with good stirring into a styrene at 25° C. to give 90% w/w solution of the polyester in styrene.

50 grams of the polyester-styrene solution was mixed with 1.0 gram of benzoyl peroxide. The mixture formed a straw colored somewhat flexible solid in about 2 hours at room temperature. The resulting polymer has improved fire retardant properties as compared to polyester polymer prepared in an identical manner using conventional polytetramethylene ether glycol as an ingredient.

EXAMPLE 10

The procedure of Example 9 is repeated, except that the fire retardant polytetramethylene ether glycol product of Example 5 is used as the diol ingredient, and the product of Example 10 is substantially identical with respect to the fire retardant characteristics of the product produced in accordance with Example 9.

Thus, it is manifest from the above disclosure, including the illustrative examples, that the present invention provides a modified fire retardant polytetramethylene ether glycol which is useful in the preparation of polyester and polyurethane compositions having improved fire retardant characteristics. It is also apparent that the production of the modified polytetramethylene ether glycol involves the use of no reaction equipment over and above that which is presently used to make non-modified polytetramethylene ether glycol. It is also apparent that the modified fire retardant polytetramethylene ether glycol of this invention is conveniently produced by making a simple modification in methods which are presently commercially used to produce unmodified polytetramethylene ether glycol. This simple modification comprises the addition of 2,3-dibromo-2-butene-1,4-diol to the catalytically active THF-polymer-catalyst mixture prior to the addition of the catalytic activity terminating agent. In addition, the compound of the present invention provides a fire retardant reactive ingredient which is utilized in methods which are identical to the present methods for incorporating polytetramethylene ether glycol into polyurethane and polyester compositons.

Finally, it is also apparent that the resulting polyurethane compositions have maintained, and in some instances improved low temperature flexible elastomeric properties, in addition exhibit very substantially improved fire retardant characterististics.

The invention is not to be limited by the illustrative examples, and it will be apparent to those skilled in the art that many modifications and variations of the present invention can be employed without departing from the spirit of the invention.

For example, much variation between the ratios of tetrahydrofuran and catalyst and the bromo-diol can be utilized without departing from the spirit or scope of the present invention, and the fire retardant modified polytetramethylene ether glycol of this invention can be used either as the sole high molecular weight diol, or as a replacement for portions of the high molecular weight diol, with approximately proportionate improvement in fire retardant characteristics.

I claim:

1. A glycol composition having the following structural formula:

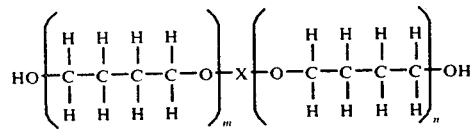

wherein $m$ and $n$ are integers including zero, and wherein both $m$ and $n$ are not zero at the same time, and wherein X is a structure having the formula:

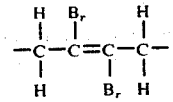

wherein $m$ and $n$ are such that the number average molecular weight of the composition is in the range of 400–5000, inclusive.

2. The composition of claim 1 wherein $n$ is zero.

* * * * *